United States Patent [19]

Schupback

[11] 4,234,012
[45] Nov. 18, 1980

[54] HOSE SUPPORT BRACKET FOR BACKHOE SWING FRAME

[75] Inventor: Jesse L. Schupback, Durango, Iowa

[73] Assignee: Deere & Company, Moline, Ill.

[21] Appl. No.: 33,771

[22] Filed: Apr. 27, 1979

[51] Int. Cl.³ .............................................. F16L 13/04
[52] U.S. Cl. ................................ 137/899.1; 280/421;
  248/68 R; 137/355.17
[58] Field of Search ......................... 248/68 R, 75, 89;
  211/60 R, 60 A; 280/421; 137/355.17, 344, 343

[56] References Cited

U.S. PATENT DOCUMENTS

| | | | |
|---|---|---|---|
| 2,997,531 | 8/1961 | Oldham et al. | 248/68 R |
| 3,722,916 | 3/1973 | Muntjonoff | 248/75 |
| 3,872,881 | 3/1975 | Miller et al. | 137/355.17 |
| 3,885,816 | 5/1975 | Miller et al. | 137/355.17 |
| 4,156,487 | 5/1979 | Dowd et al. | 280/420 |

FOREIGN PATENT DOCUMENTS 2648673 5/1978 Fed. Rep. of Germany ........ 248/68 R

Primary Examiner—Martin P. Schwadron
Assistant Examiner—A. Michael Chambers

[57] ABSTRACT

A backhoe swing frame is connected to a support frame by means of a vertical pivot assembly. A hose support bracket is mounted on the swing frame and supports a plurality of hoses extending across the vertical pivot assembly from the support frame for conveying hydraulic fluid to and from a plurality of hydraulic actuators of the backhoe. The hose support bracket comprises a base plate to which the lower end of an upright plate is fixed, the upright plate being inclined away from the pivot assembly. A plurality of vertically oriented tabs are fixed to opposite ends of the upright plate and are each provided with a horizontally opening notch, the tabs being dimensioned and located such that the notches are spaced vertically and fore-and-aft from each other.

9 Claims, 3 Drawing Figures

HOSE SUPPORT BRACKET FOR BACKHOE SWING FRAME

BACKGROUND OF THE INVENTION

The present invention relates to hydraulic fluid hose routing devices and more particularly relates to a bracket for supporting hydraulic hoses routed across the pivot assembly of articulated framework.

Many vehicles and/or equipment include an articulated framework having a pivot assembly across which a plurality of hydraulic fluid hoses pass for conveying pressure fluid to and conveying return fluid from hydraulic actuators carried by one part of the framework. An example of such vehicles and/or equipment are backhoes which are constructed such as to include a swing frame pivotally connected to a support frame by a vertical pivot assembly. The backhoe boom, dipperstick, bucket and associated hydraulic actuators are borne by the swing frame and the latter conventionally has a manifold block mounted thereon to which a plurality of hydraulic hoses are coupled for conveying hydraulic fluid to and from the actuators as dictated by operation of a bank of control valves mounted on the support frame. U.S. Pat. No. 3,627,155 granted to Van der Zyl on Dec. 14, 1971 and U.S. Pat. No. 3,239,168 granted to Wiemann et al on Mar. 8, 1966 disclose structures representative of these prior art backhoes.

These prior art backhoe structures suffer the disadvantage of the manifolds therefore being relatively expensive to manufacture and of being relatively difficult to service in the event that the manifolds require replacement.

SUMMARY OF THE INVENTION

According to the present invention there is provided an improved hydraulic hose support bracket for use in supporting a plurality of hydraulic hoses routed across a pivot assembly joining two separate frame members.

An object of the invention is to provide a hydraulic hose support bracket which is relatively inexpensive to manufacture and which is easy to replace.

A more specific object of the invention is to provide a hose support bracket comprising a base plate, an upright plate fixed to the base plate and a plurality of tabs extending outwardly from opposite sides of the upright plate and respectively provided with a plurality of notches for receiving bulkhead hose fittings to which hoses are attached.

Yet another object is to provide a hose support bracket as described in the immediately preceding object wherein the tabs on each side of the upright plate are spaced vertically and fore-and-aft from each other to provide clearance for the bulkhead fitting while keeping the height of the bracket to a minimum.

These and other objects will become apparent from a reading of the ensuing description together with the appended drawings.

DESCRIPTION OF THE PREFERRED EMBODIMENT

Figure 1:
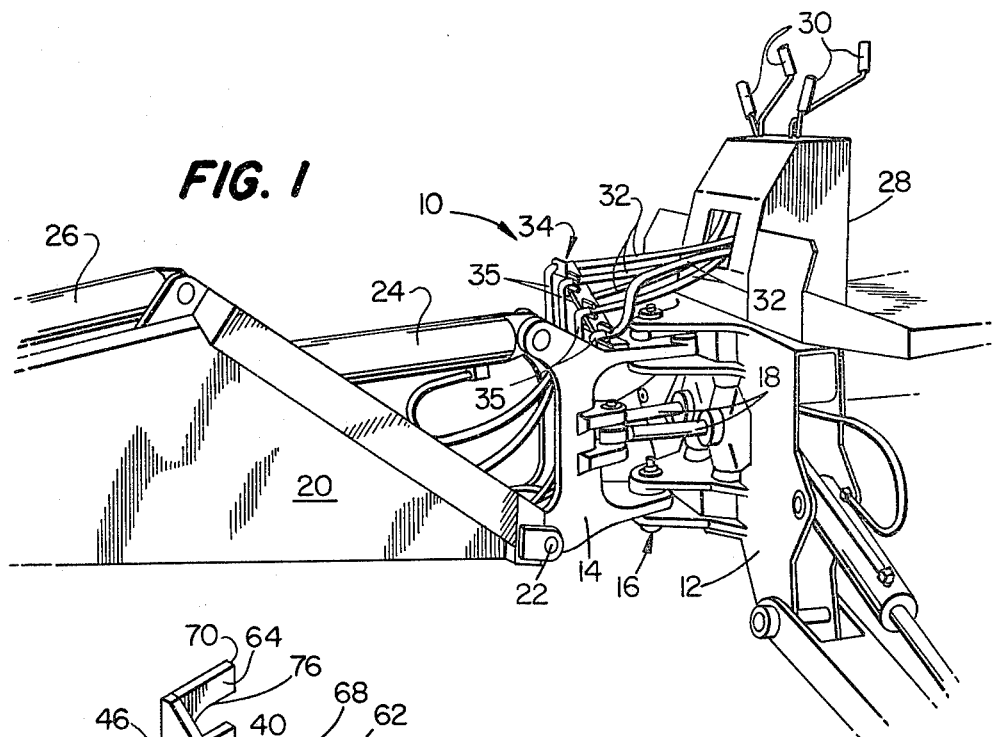
FIG. 1 is a left front perspective view of a backhoe boom swing frame connected to a support frame and having a hose support bracket, constructed in accordance with the present invention, mounted thereon.

Referring now to FIG. 1, therein is shown a backhoe structure 10 including a support frame 12 to which a swing frame 14 is coupled by means of a vertical pivot assembly 16. A pair of hydraulic swing actuators 18 are coupled between the frame 12 and 14 for selectively swinging the frame 14 relative to the frame 12 about the pivot assembly 16.

The rear end of a backhoe boom 20 is vertically pivotally connected to a lower location of the frame 14 as at 22 and a hydraulic boom actuator 24 is connected between the frame 14 and boom 20 for selectively vertically adjusting the boom 20.

While not shown here for the sake of brevity, it is to be understood that a dipperstick carrying a bucket and bucket tilt mechanism at one of its ends would have the other of its ends pivotally connected to the boom 20 in a conventional manner and that in addition to a dipperstick actuator, shown partially at 26, for pivoting the dipperstick relative to the boom 20, a bucket tilt actuator would be coupled for pivoting the bucket relative to the dipperstick.

For controlling the various hydraulic actuators heretofore described, there is provided a stack of hydraulic direction control valves mounted centrally on the frame 12 within a housing 28. A plurality of control levers 30 are connected to control spools of the valves for selectively shifting the latter so as to control the flow of fluid through a plurality of hydraulic hoses 32 respectively having first ends connected to control ports of the valve stack. The remaining ends of the hoses 32 are supported, in a manner to be presently described, by a hose support bracket 34 mounted on the swing frame 14 and also supporting respective ends of a set of hoses 35 for conveying fluid to and from the various hydraulic actuators.

Figure 2:
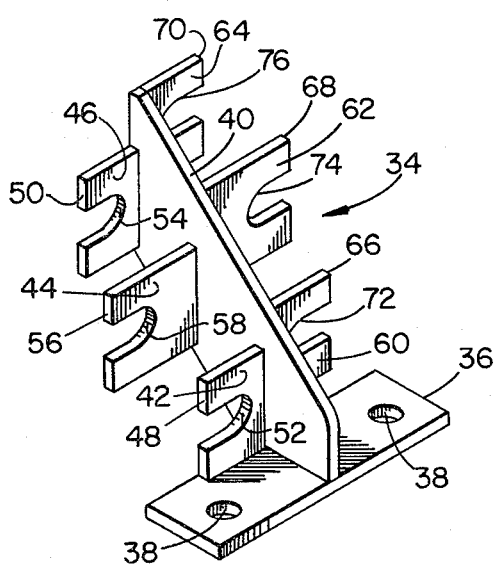
FIG. 2 is a left rear perspective view of a hose bracket constructed in accordance with the present invention.

Referring now to FIG. 2, it can be seen that the hose support bracket 34 includes a base 36 in the form of a horizontal rectangular plate provided with a pair of mounting holes 38. The bracket 34 further includes an upright plate 40 having its lower end fixed to the base 36 and being disposed in a vertical plane intersecting the base at a location midway between the opposite ends thereof. The plate 40 is inclined upwardly from the base 36 in a direction away from the pivot assembly 16. Fixed to a left surface of the plate 40 is a first set of parallel, rectangular tabs comprising a lower tab 42, also fixed to the plate 40, an intermediate tab 44 disposed above and rearwardly of the tab 42 and an upper tab 46 disposed above and rearwardly of the tab 44. The lower and upper tabs 42 and 46 respectively include left marginal edges 48 and 50 equally spaced from the plate 40 and having notches 52 and 54 located therein. The intermediate tab 44 has a left marginal edge 56 located farther from the plate 40 than the edges 48 and 50 and having a notch 58 located therein. Thus, the notches 52, 54 and 58 all open horizontally.

Similarly, fixed to a right surface of the plate 40 is a second set of parallel rectangular tabs comprising lower, intermediate and upper tabs 60, 62 and 64, respectively. The tabs 60, 62 and 64 are respectively dimensioned like the tabs 42, 44 and 46 and occupy positions respectively opposite to and slightly elevated from the positions occupied by the tabs 42, 44 and 46. Thus, tabs 60, 62 and 64 respectively have right marginal edges 66, 68 and 70 respectively provided with notches 72, 74 and 76.

Figure 3:
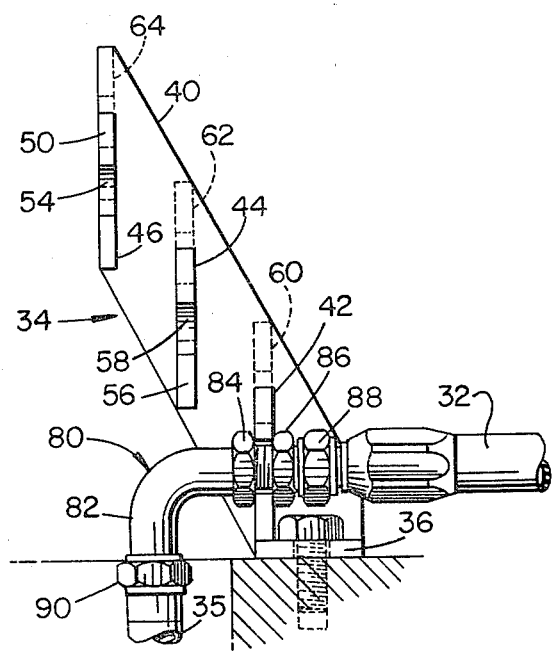
FIG. 3 is a left side elevational view of the hose bracket showing a typical 90° bulkhead hydraulic fitting releasably secured to the hose bracket.

Referring now to FIG. 3, therein is shown a right angle or 90° bulkhead hose fitting 80 received in the notch 52 of the lower tab 42. The fitting 80 includes a 90° elbow portion 82 having a horizontal leg provided with an enlarged wrench-engageable section 84 disposed against a front surface of the tab 42 while a nut 86 is received on a rearward threaded end of the leg and tightened against a rearward surface of the tab 42. A female coupling 88 at a second end of one of the hoses 32 is received on a male end of the fitting 80. Similarly, the rearward end of one of the hoses 35 is provided with a female coupling 90 received on a male end at the other end of the fitting 80. Of importance is the fact that the notch 52 is located below the level of the tab 44 such that the horizontal leg of the fitting 80 passes therebeneath.

While only one of each of the sets of hoses 32 and 35 are shown together with one fitting 80, it is to be understood that all of the hoses 32 and 35 are secured to the bracket 34 by fittings 80 in the manner just described.

The operation of the invention is thought to be apparent from the foregoing description and for the sake of brevity is not restated here.

I claim:

1. In a hydraulically controlled apparatus including first and second members interconnected by a pivot assembly defining a pivot axis extending in a first direction and about which the first member is pivotable in opposite second and third directions from a centered position, at least three hydraulic hoses extending generally through the pivot axis and having first ends supported on the first member and second ends connected to a hose support structure mounted on the second member and projecting therefrom in the first direction, an improved hose support structure comprising: a base portion secured to the second member, a support portion fixed to the base in a generally perpendicular relationship to the plane of the base portion; mounting portion means integral with the support portion and defining at least three notches with first and second ones of the three notches being located at opposite sides of a plane containing the pivot axis and including the support portion and a third one of the notches being located away from the base a distance in the direction of a support portion axis which is different than the distance at which the first and second notches are spaced from the base; said support portion including said support portion axis and a bulkhead hose fitting releasably fixed in each of the notches and each of the hoses having a fitting at its second end connected to one of the bulkhead hose fittings.

2. The hydraulically controlled apparatus defined in claim 1 wherein the three notches are spaced from another in the first direction.

3. The hydraulically controlled apparatus defined in claim 2 wherein the first and second ones of the notches are also spaced different distances from the plane.

4. The hydraulically controlled apparatus defined in claim 3 wherein at least the first and third ones of the notches are also spaced from each other in a direction defined by said support portion axis.

5. The hydraulically controlled apparatus defined in claim 1 wherein at least the first and second ones of the notches open in opposite directions.

6. The hydraulically controlled apparatus defined in claim 1 wherein said base portion is a first plate, said support portion is a second plate located in said plane and having its lower end fixed to the base and having opposite flat sides; and said mounting portion means including at least three separate tabs with first and second ones of these tabs being fixed to the opposite flat sides of the second plate and containing the first and second ones of the notches.

7. The hydraulically controlled apparatus defined in claim 6 wherein each of the first, second and third notches open horizontally relative to said first plate.

8. The hydraulically controlled apparatus defined in claim 6 wherein the second plate is inclined upwardly and away from the first plate in the direction of said support portion axis.

9. The hydraulically controlled apparatus defined in claim 6 wherein the tabs are each oriented vertically relative to the plane of the first plate.

* * * * *